United States Patent
Gumpoltsberger

(10) Patent No.: US 7,201,697 B2
(45) Date of Patent: Apr. 10, 2007

(54) MULTI-SPEED GEARBOX

(75) Inventor: Gerhard Gumpoltsberger, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 122 days.

(21) Appl. No.: 10/517,237

(22) PCT Filed: Jul. 5, 2003

(86) PCT No.: PCT/EP03/07215

§ 371 (c)(1),
(2), (4) Date: Dec. 8, 2004

(87) PCT Pub. No.: WO2004/007995

PCT Pub. Date: Jan. 22, 2004

(65) Prior Publication Data

US 2005/0245343 A1 Nov. 3, 2005

(30) Foreign Application Priority Data

Jul. 11, 2002 (DE) .............................. 102 31 348

(51) Int. Cl.
*F16H 3/62* (2006.01)
(52) U.S. Cl. ..................................... 475/275
(58) Field of Classification Search ................. 475/275
See application file for complete search history.

(56) References Cited

U.S. PATENT DOCUMENTS 4,660,439 A    4/1987   Hiraiwa
5,007,887 A    4/1991   Asada
5,049,116 A    9/1991   Asada
5,106,352 A    4/1992   Lepelletier
5,226,862 A    7/1993   Hattori
6,139,463 A   10/2000   Kasuya et al.
6,217,474 B1   4/2001   Ross et al.
6,572,507 B1   6/2003   Korkmaz et al.
6,634,980 B1  10/2003   Ziemer
6,669,597 B1 * 12/2003  Usoro et al. ................ 475/323
6,672,987 B1 *  1/2004  Raghavan et al. .......... 475/269
6,712,731 B1 *  3/2004  Raghavan et al. .......... 475/275
2003/0162623 A1 8/2003  Raghavan et al.
2003/0162624 A1 8/2003  Kao et al.

FOREIGN PATENT DOCUMENTS

DE    689 07 319 T2    11/1993

(Continued)

*Primary Examiner*—Dirk Wright
(74) *Attorney, Agent, or Firm*—Davis Bujold & Daniels, P.L.L.C.

(57) ABSTRACT

The multi-speed transmission comprises one input shaft and one output shaft located in one housing, three one-spider planetary gear sets, seven rotatable shafts as well as six shifting elements, the selective engagement of which implements seven forward gears and one reverse gear. The input drive results by one shaft connected with the sun gear of the first planetary gear set, the output drive results via one shaft connected with the spider of the third planetary gear set, one shaft is permanently connected with the sun gear of the third planetary gear, one shaft is connected with the ring gear of the first planetary gear set and the ring gear of the second planetary gear set, one shaft is connected with one element of the second planetary gear set and the ring gear of the third planetary gear set, one shaft is permanently connected with one other element of the second planetary gear set, one shaft is connected with the spider of the first planetary gear set.

20 Claims, 1 Drawing Sheet

FOREIGN PATENT DOCUMENTS

| | | |
|---|---|---|
| DE | 689 07 338 T2 | 11/1993 |
| DE | 199 12 480 A1 | 9/2000 |
| DE | 199 49 507 A1 | 4/2001 |
| DE | 100 43 751 A1 | 6/2001 |
| EP | 0 434 525 A1 | 6/1991 |
| JP | 04029650 A | 1/1992 |

* cited by examiner

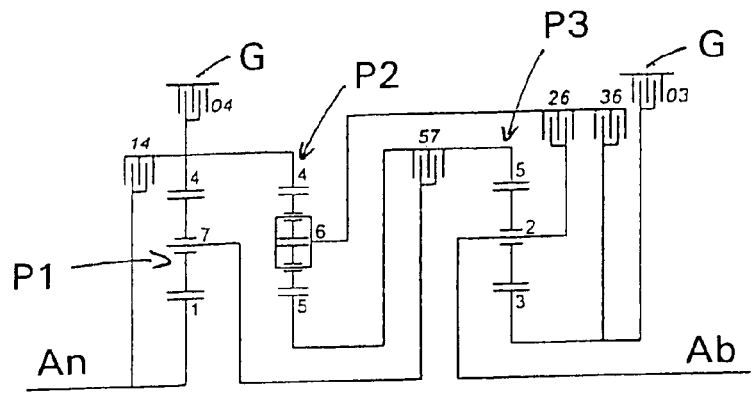
Fig. 1
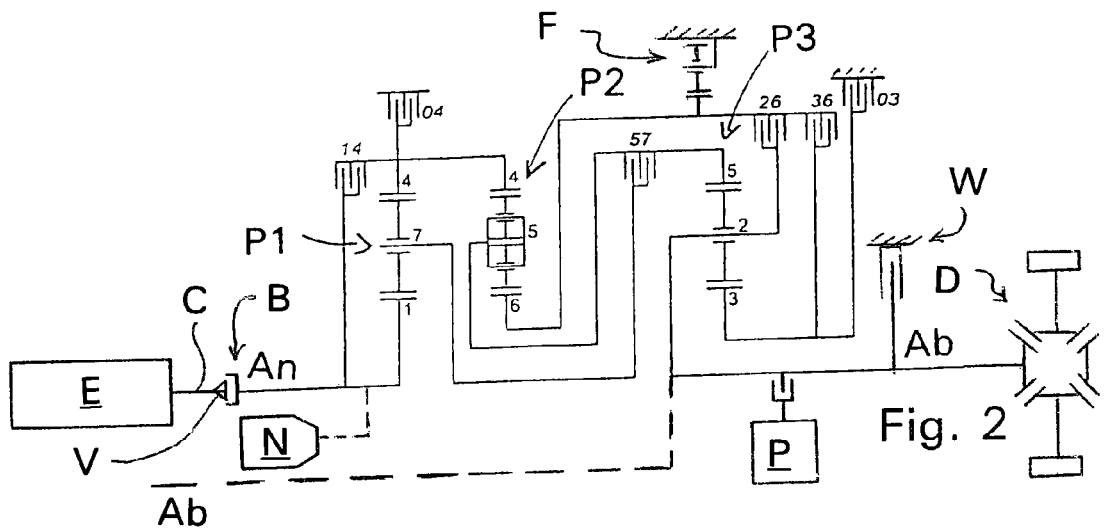
Fig. 2
Fig. 3

MULTI-SPEED GEARBOX

This application is a national stage completion of PCT/EP2003/007215 filed Jul. 5, 2003 which claims priority from German Application Serial No. 102 31 348.2 filed Jul. 11, 2002.

FIELD OF THE INVENTION

This invention relates to a multi-speed transmission in planetary design, especially an automatic transmission of a motor vehicle.

BACKGROUND OF THE INVENTION

In the automatic transmission prior art, particularly for motor vehicles, comprised planetary gear sets switched by means of frictional or shifting elements such as clutches and brakes and were usually connected with a starting element subject to slip effect and optionally provided with a lock-up clutch such as a hydrodynamic torque converter or a fluid clutch.

Such a transmission results from EP 0 434 525 A1. It essentially comprises one input shaft and one output shaft parallel to each other, one double planetary gear set disposed concentrically with the output shaft and five shifting elements in the form of three clutches and two brakes, the selective locking of which by pairs determines the different gear ratios between the input shaft and the output shaft. This transmission has one front-mounted gear set and two power paths so that by the selective engagement by pairs of the five shifting elements, six forward gears are obtained.

In the first power path, two clutches are needed to transmit the torque from the front-mounted gear set to two elements of the double planetary gear set. These are situated in power flow direction essentially behind the front-mounted gear set in direction of the double planetary gear set. In the second power path, one other clutch is provided which detachably connects them with one other element of the double planetary gear set. The clutches are disposed in a manner such that the internal disc carrier forms the output drive.

The published U.S. Pat. No. 6,139,463 has further disclosed a compact multi-speed transmission in planetary design, particularly for a motor vehicle, which has two planetary gear sets and one front-mounted gear set, the same as three clutches and two brakes. In this known multi-speed transmission, two clutches C-1 and C-3 are provided in a first power path for transmitting the torque from the front-mounted gear set to the two planetary gear sets. The external disc carrier or the cylinder or piston and pressure compensation side of the clutch C-3 is connected with a first brake B-1. Besides, the internal disc carrier of the third clutch C-3 is connected with the cylinder or piston and pressure compensation side of the first clutch C-1, the internal disc carrier of the first clutch C-1 being situated on the output side and connected with a sun gear of the third planetary gear set.

From the Applicant's DE 199 49 507 A1, a multi-speed transmission is also known where, on the input shaft, two non-shiftable, front-mounted gear sets are provided which, on the output side, generate two rotational speeds which, together with the rotational speed of the input shaft, can be optionally shifted by selective closing of the shifting elements used to a shiftable double planetary gear set acting upon the output shaft so that, for changing over from one gear to the respective next following higher gear or lower gear of the two precisely actuated shifting elements, only one shifting element has to be engaged or disengaged.

DE 199 12 480 A1 has also disclosed an automatically shiftable motor vehicle transmission having three one-spider planetary gear sets, the same as three brakes and two clutches, for shifting six forward gears and one reverse gear and having one input shaft the same as one output shaft. The automatically shiftable motor vehicle transmission is designed so that the input shaft is directly connected with the sun gear of the second planetary gear set and that the input shaft is connectable via the first clutch with the sun gear of the first planetary gear set and/or via the second clutch with the spider of the first planetary gear set. Additionally or alternatively, the sun gear of the first planetary gear set is connectable with the housing of the transmission, via the first brake, and/or the spider of the first planetary gear set, via the second brake, and/or the sun gear of the third planetary gear set, via the third brake.

The problem on which the invention is based is to propose a multi-speed transmission of the type mentioned above in which the construction cost is optimized and, in addition, the efficiency degree is improved in the main drive gears with regard to towing and toothing losses. Besides, low torques are to act upon the shifting elements and planetary gear sets in the inventive multi-speed transmission and the rotational speeds of the shafts, shifting elements and planetary gear sets are to be kept as low as possible. The number of gears and the spreading of the transmission are also to be increased.

SUMMARY OF THE INVENTION

An inventive multi-speed transmission in planetary design is proposed which has one input shaft and one output shaft located in one housing. At least three one-spider planetary gear sets, at least seven rotatable shafts and at least six shifting elements, including brakes and clutches, are provided; the selective engagement produces different reduction ratios between the input shaft and the output shaft so that preferably seven forward gears and one reverse gear can be implemented.

According to this invention, in the multi-speed transmission is provided that the input drive results by one shaft permanently connected with the sun gear of the first planetary gear set and that the output drive results via one shaft connected with the spider of the third planetary gear set. Further provided in the inventive multi-speed transmission is that one other shaft is permanently connected with the sun gear of the third planetary gear set, that another shaft is permanently connected with the ring gear of the first planetary gear set and the ring gear of the second planetary gear set, that another shaft is permanently connected with one element of the second planetary gear set and the ring gear of the third planetary gear set, that one other shaft is permanently connected with one other element of the second planetary gear set and that one other shaft is permanently connected with the spider of the first planetary gear set, the planetary gear sets being coupled with shafts and shifting elements. According to the invention, the shaft connected with the ring gear of the third planetary gear set can be connected with the sun gear or the spider of the second planetary gear set; the shaft connected with the second planetary gear set being accordingly connected with the spider or the sun gear thereof.

According to the invention, the first and the third planetary gear sets are designed as minus planetary gear sets; the second planetary gear set is a plus planetary gear set.

By virtue of the inventive development of the multi-speed transmission, adequate ratios and a considerable increase of the total spreading of the multi-speed transmission result whereby comfort in driving is improved and a significant reduction in consumption attained.

The inventive multi-speed transmission is fit for every motor vehicle, especially for passenger cars and commercial motor vehicles, such as trucks, autobuses, construction vehicles, rail vehicles, track-laying vehicles and the like.

Furthermore, the inventive multi-speed transmission considerably reduces the construction cost as a result of a small number of shifting elements, preferably four clutches and two brakes. It is advantageously possible with the inventive multi-speed transmission to start off with a hydrodynamic converter, an external starting clutch or also with any other adequate external starting elements. A starting operation with a starting element integrated in the transmission is also conceivable to make possible. Preferably adequate is a shifting element actuated in the first gear and in the reverse gear.

A good degree of efficiency in the main drive gears also results with the inventive multi-speed transmission with regard to towing and gearing losses.

There are also low torques in the shifting elements and in the planetary gear sets of the multi-speed transmission whereby the wear in the multi-speed transmission is advantageously reduced. In addition, the low torque makes correspondingly small dimensions possible whereby the installation space needed and the attendant expenses are reduced. The rotational speeds are low in the shafts, shifting elements and planetary gear sets.

Moreover, the inventive transmission is designed so that an adaptability to different drive line developments is possible, both in power flow direction and with regard to space.

BRIEF DESCRIPTION OF THE DRAWINGS

The invention will now be described, by way of example, with reference to the accompanying drawings in which:

FIG. 1 is a diagrammatic view of a preferred embodiment of the inventive multi-speed transmission;

FIG. 2 is a diagrammatic view of another preferred embodiment of an inventive multi-speed transmission; and FIG. 3 is a switch system of the inventive multi-speed transmission according to FIG. 1 and FIG. 2.

DETAILED DESCRIPTION OF THE INVENTION

FIGS. 1 and 2 show the inventive multi-speed transmission with one input shaft 1 (An) and one output shaft 2 (Ab) located in one housing G. Three one-spider planetary gear sets P1, P2, P3 are provided. The first planetary gear set P1 and the third planetary gear set P3 are designed as minus planetary gear sets; the second planetary gear set P2 is designed as plus planetary gear set according to the invention.

As can be seen from FIGS. 1 and 2, only six shifting elements, namely two brakes 03, 04 and four clutches 14, 26, 36, and 57, are provided.

With the shifting elements, a selective engagement of seven forward gears and one reverse gear can be implemented. According to FIG. 1, the inventive multi-speed transmission has a total of seven rotatable shafts, namely the shafts 1, 2, 3, 4, 5, 6 and 7.

According to the invention in the multi-speed transmission according to FIG. 1, it is provided that the input drive results by the shaft 1 permanently connected with the sun gear of the first planetary gear set P1. The output drive results via the shaft 2 connected with the spider of the third planetary gear set P3. In addition, the shaft 3 is permanently connected with the sun gear of the third planetary gear set P3 and the shaft 4 is permanently connected with the ring gear of the first planetary gear set P1 and the ring gear of the second planetary gear set P2. Moreover, the shaft 5 is permanently connected with the sun gear of the second planetary gear set P2 and the ring gear of the third planetary gear set P3. According to the invention, the other rotatable shaft 6 is permanently connected with the spider of the second planetary gear set P2; the shaft 7 being permanently connected with the spider of the first planetary gear set P1.

In the inventive multi-speed transmission, the shaft 3 can be attached to the housing G by the brake 03 and the shaft 4 by the brake 04. The clutch 14 detachably interconnects the shaft 1 and the shaft 4; the shaft 2 and the shaft 6 are detachably interconnectable via the clutch 26. In addition, the clutch 36 detachably interconnects the shafts 3 and 6 and the clutch 57 interconnects the shafts 5 and 7.

FIG. 2 shows another embodiment of the inventive multi-speed transmission. The only difference from the embodiment in FIG. 1 is that the shaft 5 is connected with the spider of the second planetary gear set P2 and the ring gear of the third planetary gear set P3 and that the shaft 6 is permanently connected with the sun gear of the second planetary gear set P2.

In FIG. 3 is shown a switch system of the inventive multi-speed transmission according to FIGS. 1 and 2. From the switch system, the respective ratios i of the individual gear steps can be inferred and the ratio ranges φ to be determined therefrom. It can further be inferred from the switch system that, in sequential shifting mode, double shifts are prevented since two adjacent gear steps use two shifting elements in common.

The brake 04 and the clutches 36 and 57 are activated for the first gear. The second gear results from the brake 03, the brake 04 and the clutch 57 and the third gear from the clutches 36, 57 and the brake 03. In the fourth gear, the clutches 26 and 57, the same as the brake 03, are activated. According to FIG. 3, the fifth gear results by closing the clutches 14 and 57 and the brake 03; the sixth gear requires the combination of the clutches 14, 26 and the brake 03. For the seventh gear, the clutches 14, 26 and 57 are required while the reverse gear results by closing the brake 04 and the clutches 26 and 57.

It is possible, according to the invention, to provide in each fit point of the multi-speed transmission free wheels F, for example, between one shaft and the housing or in order to connect two shafts if that is the case.

It is also possible by the inventive design to situate on the same side of the transmission or of the housing input drive An and output drive Ab, preferably for transverse, front, longitudinal, rear longitudinal or all-wheel arrangements. In addition, an axle differential and/or a transfer differential D can be placed on the input side or on the output side.

Within the scope of an advantageous development, the input shaft 1 can be separated, as needed, from a prime mover by a coupling element B, there being used as coupling element a hydrodynamic converter, a hydraulic clutch, a dry starting clutch, a wet starting clutch, a magnetic powder clutch or a centrifugal clutch. It is also possible to situate such a starting element in power flow direction behind the transmission in which case the input shaft 1 is permanently connected with the crankshaft C of the engine E. According to the invention, it is also possible to start off by means of one shifting element of the transmission. As starting element can be preferably used the brake 04 which is activated both in the first forward gear and in the first reverse gear.

The inventive multi-speed transmission also enables to situate a torsional vibration damper V between engine and transmission.

Within the scope of another embodiment (not shown) of the invention, there can be placed upon each shaft, preferably upon the input shaft 1 or the output shaft 2, one wear-free brake W such as a hydraulic or electric retarder or the like which is especially important for use in commercial vehicles. For driving additional units, it is also possible to provide a power takeoff P upon each shaft, preferably upon the input shaft 1 or the output shaft 2.

The shifting elements used can be designed as power shiftable clutches or brakes. Force-locking clutches or brakes such as multi-disc clutches, band brakes and/or tapered clutches can especially be used. As shifting elements can also be used force-locking brakes and/or clutches, for example, synchronizer units or dog clutches.

Another advantage of the multi-speed transmission introduced here is that upon each shaft, one electric machine N can be mounted as generator and/or as added prime mover.

The functional features of the claims can be practically designed in most different manners. For the sake of simplicity, said practical possible designs have not been explicitly described. However, every practical design of the invention, in particular, every spatial arrangement of the planetary gear sets and of the shifting elements or relative to each other and, as long as technically logical, obviously falls under the scope of protection.

| Reference numerals | |
|---|---|
| 1 shaft | P1 planetary gear shaft |
| 2 shaft | P2 planetary gear shaft |
| 3 shaft | P3 planetary gear shaft |
| 4 shaft | |
| 5 shaft | An input drive |
| 6 shaft | Ab output drive |
| 7 shaft | i ratio |
| 03 brake | φ ratio range |
| 04 brake | G housing |
| 14 clutch | |
| 26 clutch | |
| 36 clutch | |
| 57 clutch | |

The invention claimed is:

1. A multi-speed transmission of planetary gear design for a motor vehicle comprising:
   one input shaft (1), one output shaft (2) and a third, fourth, fifth, sixth and seventh rotatable shafts (3, 4, 5, 6, 7) located in a housing (G);
   a first, second and third one-spider planetary gear sets (P1, P2, P3);
   a first, second, third, fourth, fifth and sixth shifting elements (03, 04, 14, 26, 36, 57) the selective engagement of which generates different reduction ratios between the input shaft (1) and the output shaft (2) so that seven forward gears and one reverse gear can be implemented; and
   wherein an input drive comprises the first shaft (1) permanently connected with a sun gear of the first planetary gear set (P1) and an output drive comprises the output shaft (2) permanently connected with a sun gear of the third planetary gear set (P3), the set (P1) and a ring gear of the second planetary gear set (P2), and the fifth rotatable shaft (5) is permanently connected with the second planetary gear set (P2) and a ring gear of the third planetary gear set (P3), the sixth rotatable shaft (6) is permanently connected with the second planetary gear set (P2), the seventh rotatable shaft (7) is permanently connected with a spider of the first planetary gear set (P1), the third rotatable shaft (3) is attachable to the housing (G) by the first shifting element (03), the fourth shaft (4) is attachable to the housing (G) by the second shifting element (04), the third shifting element (14) interconnects the input shaft (1) and the fourth rotatable shaft (4), the fourth shifting element (26) detachably interconnects the output shaft (2) and the sixth rotatable shaft (6), the fifth shifting element (36) detachably interconnects the third shaft (3) and the sixth shaft (6) and the sixth shifting element (57) detachably interconnects the fifth rotatable shaft (5) and the seventh rotatable shaft (7).

2. The multi-speed transmission according to claim 1, wherein the fifth rotatable shaft (5) is permanently connected with a sun gear of the second planetary gear set (P2) and the ring gear of the third planetary gear set (P3) and the sixth rotatable shaft (6) is permanently connected with a spider of the second planetary gear set (P2).

3. The multi-speed transmission according to claim 1, wherein the fifth rotatable shaft (5) is permanently connected with a spider of the second planetary gear set (P2) and the ring gear of the third planetary gear set (P3), and the sixth rotatable shaft (6) is permanently connected with a sun gear of the second planetary gear set (P2).

4. The multi-speed transmission according to claim 1, wherein the first planetary gear set (P1) and the third planetary gear set (P3) are designed as reduction planetary gear sets and the second planetary gear set (P2) is designed as an increasing planetary gear set.

5. The multi-speed transmission according to claim 1, wherein free wheels are provided between at least one of the first, second, third, fourth, fifth, sixth and seventh shafts (1, 2, 3, 4, 5, 6, 7) and the housing (G).

6. The multi-speed transmission according to claim 1, wherein the input drive and the output drive are provided on a same side of the housing.

7. The multi-speed transmission according to claim 1, wherein at least an axle and a transfer differential are connected with at least one of the input drive and the output drive.

8. The multi-speed transmission according to claim 1, wherein the input shaft (1) can be separated from a prime mover by a coupling element.

9. The multi-speed transmission according to claim 8, wherein the coupling element is one of a hydrodynamic converter, a hydraulic clutch, a dry starting clutch, a wet starting clutch, a magnetic powder clutch and a centrifugal clutch.

10. The multi-speed transmission according to claim 9, wherein an external starting element can be disposed in a power flow direction behind the transmission, the input shaft (1) being fixedly connected with a crank shaft of an engine.

11. The multi-speed transmission according to claim 1, wherein a start-off of the vehicle results by selecting one of the shifting elements of the transmission and the input shaft (1) being connected with a crankshaft of an engine.

12. The multi-speed transmission according to claim 11, wherein the selected shifting element is one of the fourth clutch (57) and the second brake (04).

13. The multi-speed transmission according to claim 1, wherein a torsional vibration damper is positioned between an engine and the transmission.

14. The multi-speed transmission according to claim 1, wherein one wear-free brake can be situated upon each shaft.

15. The multi-speed transmission according to claim 1, wherein a power takeoff can be placed upon a selected rotatable shaft for an additional output from the transmission.

16. The multi-speed transmission according to claim 15, wherein the power takeoff can be situated on at least one of the input shaft (1) and the output shaft (2).

17. The multi-speed transmission according to claim 1, wherein the shifting elements are designed as one of power shiftable clutches and brakes.

18. The multi-speed transmission according to claim 17, wherein the shifting elements are at least one of multi-disc clutches, band brakes and tapered clutches.

19. The multi-speed transmission according to claim 1, wherein the shifting elements are at least one of force-locking brakes and clutches.

20. The multi-speed transmission according to claim 1, wherein on each shaft one electric machine can be mounted as one or more of a generator and an added prime mover.

* * * * *